Sept. 11, 1945.   T. O. MEHAN   2,384,761
GYRO-VERTICAL
Filed Nov. 10, 1943   3 Sheets-Sheet 1

INVENTOR.
Thomas O. Mehan
BY Thomas S. Ross
Attorney.

Sept. 11, 1945. T. O. MEHAN 2,384,761
GYRO-VERTICAL
Filed Nov. 10, 1943 3 Sheets-Sheet 2

INVENTOR.
Thomas O. Mehan
BY
Thomas S. Ross
Attorney.

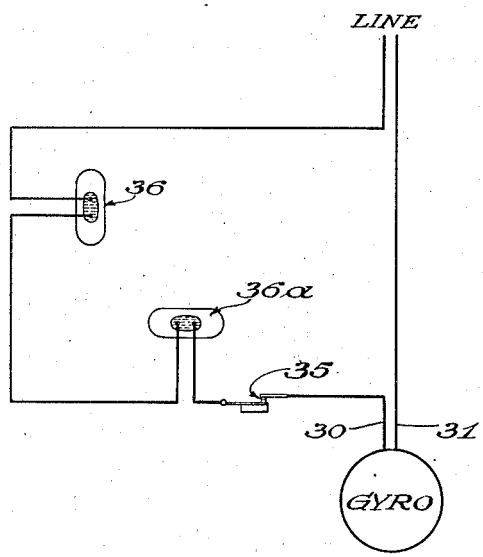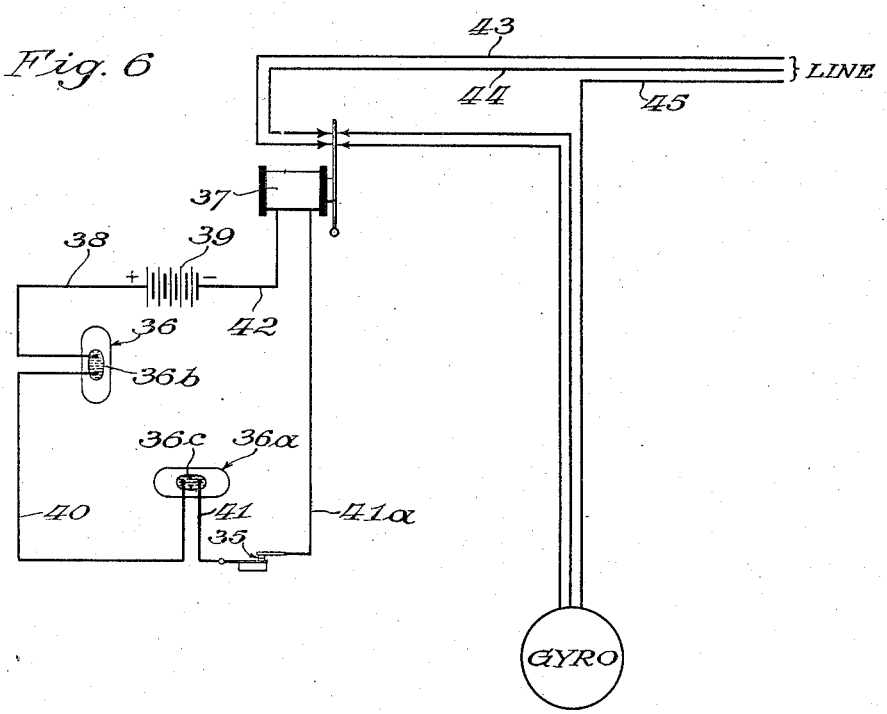

Patented Sept. 11, 1945

2,384,761

UNITED STATES PATENT OFFICE 2,384,761

GYRO-VERTICAL

Thomas O. Mehan, Park Ridge, Ill., assignor to Victor Adding Machine Co., Chicago, Ill., a corporation of Illinois Application November 10, 1943, Serial No. 509,939

11 Claims. (Cl. 74—5)

The present invention is a continuation in part, of my co-pending application, Serial Number 490,432, filed June 11, 1943, for Gyro-verticals.

In the aforesaid application, I have shown a gyroscopic device in the form of a gyro-vertical wherein the gyro rotor is universally mounted within gimbals to have a normally vertical spin axis, and wherein the rotor is electrically driven from the rotating field of a universally mounted pendulous stator. It is also shown that the rotor and pendulous stator are mounted independently of each other and in such manner that they are free to tilt with respect to one another, and that an electromagnetic couple is created between the rotor and pendulous stator when a working current is connected to the stator field coils.

It is further pointed out in said co-pending application that said electric couple or magnetic pull, created between the stator and rotor, acts to normally exert a stabilizing influence upon the rotor to prevent its spin axis from precessing or departing from its normal vertical position when subjected to unfavorable torques or stresses. Such detrimental torques or stresses are brought about, for example, by friction in the rotor and gimbal bearings and/or rotation of the earth. However, when a gyro-vertical constructed and arranged in the manner shown and described in my above mentioned co-pending application is installed upon a vehicle such as an airplane, or upon ships, tanks, etc., which are capable of rapid acceleration and deceleration movements, still other unfavorable torques or stresses are experienced which have sufficient magnitude to affect the pendulous action of the universally mounted stator.

It is an object of the present invention, therefore, to provide simple, efficient and reliable means to prevent precession of the rotor spin axis when unfavorable torques or stresses are experienced during a sudden increase or decrease in the speed of the vehicle upon which my improved gyro-vertical is mounted.

More limitedly, it is an object of the present invention to provide gravity controlled means for determining when energization and de-energization of the stator field coils takes place, such control being fully automatic in its operation and capable of functioning within a predetermined number of degrees of tilt of the vehicle upon which my device is mounted.

From an understanding of the principle upon which my improved gyro-vertical operates it will be observed that precession of the rotor spin axis is prevented during complete stabilization of the universally mounted stator and conversely any unfavorable torques or stresses imparted to the stator will act to precess the rotor through the stator rather than prevent precession in the desired manner. For example when my improved gyroscopic device is installed in an airplane for the purpose of indicating the true vertical, I have found it highly desirable to provide gravity controlled switch means which will automatically become effective to de-energize the stator field coils whenever unfavorable torques or stresses are imparted to the stator.

As an embodiment of my invention, the gravity controlled switch mechanism chosen for illustration purposes comprises a microswitch and a pair of mercury switches the latter being mounted substantially at right angles to one another, but it will be obvious that various other gravity controlled switch means could be substituted without departing from the scope or spirit of the present invention.

The foregoing objects and others hereinafter appearing are attained in the embodiment of the invention illustrated in the accompanying drawings wherein:

Fig. 5 is a wiring diagram suitable for use where the stator rotating field coils are operated by a single phase current, and Fig. 6 is a similar wiring diagram for use where the stator rotating field coils are operated by a three phase current.

Figure 1:
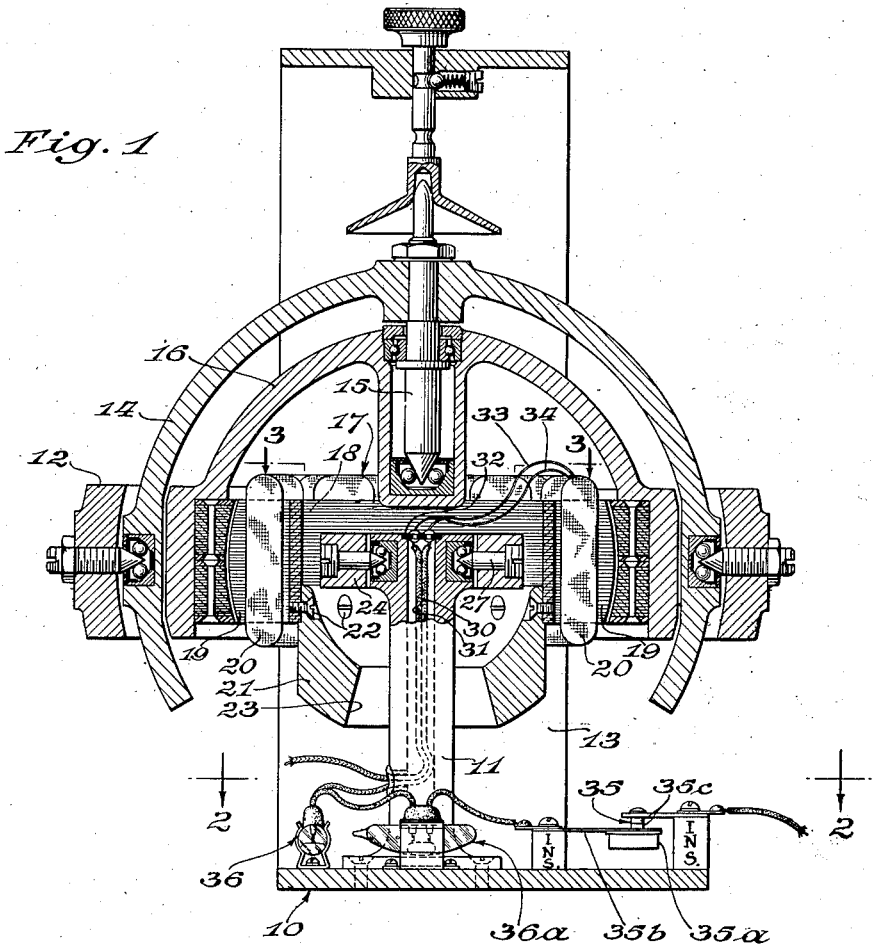
Fig. 1 is a central vertical section of a gyro-vertical constructed in accordance with my invention and showing one form of the gravity controlled switch mechanism which may be used for the stator field coils.

The construction of the gyro-vertical selected for illustration purposes is identical to that shown in my aforesaid patent application Serial No. 490,432, filed June 11, 1943, and comprises a substantially rectangular main frame or housing 10 capable of being rigidly attached to a moving craft such as an airplane, in any suitable manner. A vertically disposed hollow post 11 rigidly fixed to the housing 10 serves to support the stator 17 in a manner presently disclosed. Reference numeral 12 designates an outer gimbal ring which is pivotally supported by the vertical branches 13 of frame 10 to rock about a horizontal axis. This outer gimbal ring in turn pivotally supports an inner gimbal ring 14 which rocks about a horizontal axis disposed at right angles to the pivotal axis of said outer gimbal ring 12.

It will be noted from Fig. 1 that the inner gimbal ring 14 rigidly supports a vertically depending spindle or shaft 15 which serves as the normally vertical spin axis for rotor 16.

Figure 4:
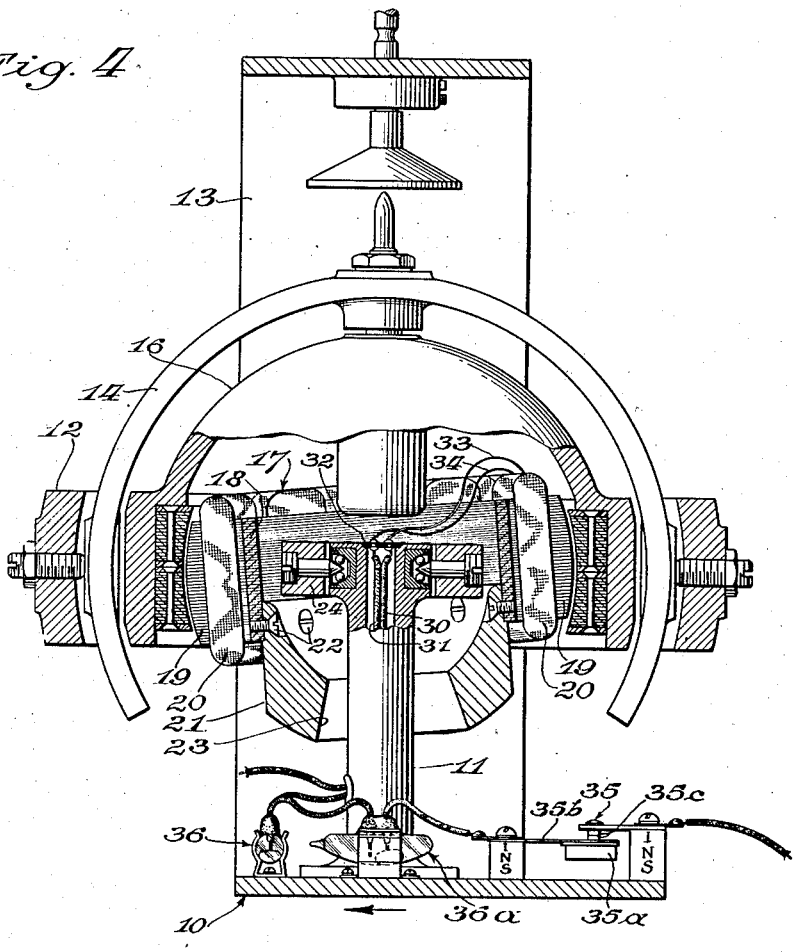
Fig. 4 is a central vertical section partly in elevation similar to Fig. 1 but showing the stator slightly tilted relative to the rotor as would be the case should the gyro-vertical be in operation and suddenly moved or shifted in the direction indicated by the arrow.
Figure 3:
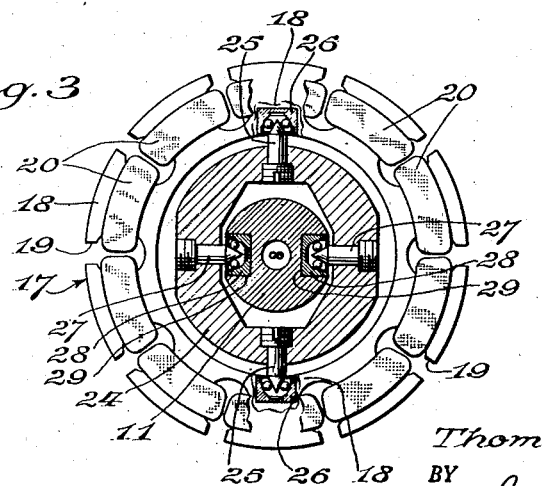
Fig. 3 is a detailed plan view partly in horizontal section on the line 3—3 of Fig. 1, to clearly illustrate the universal mounting for the pendulous stator.

The electrical means for spinning the rotor 16 at high speeds is likewise identical to that shown in my said copending application. This means, as shown in Figs. 1, 3 and 4, consists of a universally mounted pendulous stator 17 which comprises a plurality of metal stampings 18 having slots 19 therein within which field coils 20 are wound. The stator is made pendulous by a weight 21 attached thereto by screws 22. This weight or pendulum 21 has a centrally disposed tapered opening 23 through which the hollow post 11 passes.

The stator 17 is mounted for universal movement, relative to the post 11 and rotor 16, by a small gimbal ring 24 having outwardly projecting pins 25—25, the pointed ends of which engage with anti-friction bearings 26—26, which are preferably pressed into sockets formed in the stator laminations or stampings 18. Gimbal ring 24 also has inwardly projecting pins 27—27 the pointed ends of which engage with anti-friction bearings 28—28 respectively. The latter bearings preferably have a pressed fit into sockets 29—29 formed in the enlarged upper end of hollow post 11 as clearly illustrated in Figs. 3 and 4.

A working current is preferably supplied to the field coils 20 through conductors 30 and 31, such conductors passing upwardly through the hollow post 11 and having their upper ends secured to an insulating disk 32. As shown this disk is pressed into a recess in the upper end of hollow post 11. The inner ends of conductors 30 and 31 are electrically connected with the stator field coils 20 by extremely flexible leads 33 and 34 respectively, which are commonly referred to as "cat's" whiskers.

As stated in the first part of this specification, the rotor is caused to spin on its vertical axis whenever the stator field coils are energized and, during horizontal stabilization of the stator, precession of the rotor spin axis is prevented by reason of the electro-magnetic couple created between the stator and rotor. However, should the stator be tilted as shown in Fig. 4, by a sudden movement of the craft upon which my improved gyro-vertical is mounted, the electro-magnetic couple between the stator and rotor will have a tendency to cause precession of the rotor until the stator is again returned to its normal horizontal position relative to the rotor by the pendulum 21 unless the field coils of the stator are de-energized during such tilt of the stator.

Figure 2:
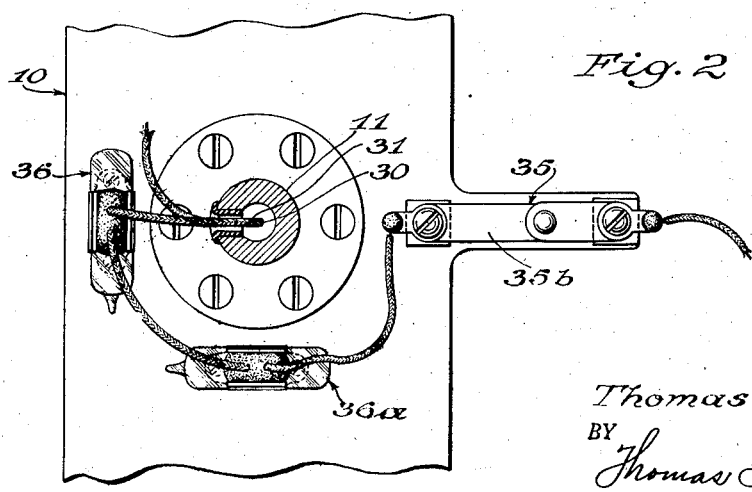
Fig. 2 is an enlarged sectional plan view of the switch mechanism shown in Fig. 1 and a portion of the gyro housing, the section being taken on a plane corresponding to the line 2—2 of Fig. 1.

Accordingly I provide simple and reliable means for de-energization the stator field coils whenever the stator is tilted beyond a pre-determined number of degrees from the true vertical. This means may comprise electrical switches such as microswitch 35 and mercury switches 36 and 36a shown in Figs. 1, 4 and 5. When using the mercury type switches for aircraft installation I have found it convenient to mount them on the base of the housing or frame 10 so that when the frame is substantially level relative to the ground over which the plane is flying, both switches are closed to complete the electrical circuit for the stator field coils. Further for aircraft installation it is desirable to mount the mercury switches 36 and 36a at right angles relative to one another in the manner shown in Figs. 1 and 2. As illustrated, the gravity controlled mercury switch 36 is mounted longitudinally or fore and aft of the plane and consequently will become effective to open the stator field coil circuit whenever the plane is caused to suddenly climb or dive or when its forward speed is suddenly increased or decreased during substantially level flight.

The gravity controlled mercury switch 36a is mounted laterally relative to the plane and therefore becomes effective to open the stator field coil circuit whenever the plane is suddenly moved laterally or tilted at an angle while in straight flight.

It should be noted however, when the plane is caused to execute a perfect bank, or curved flight so to speak, that centrifugal force will act upon the pendulous stator thus causing it to remain horizontal with respect to the plane, but to be tilted relative to the rotor and to the ground over which the plane is flying. Under the last assumed conditions the gravity controlled switches 36 and 36a will not open to break the stator field coil circuit but instead will remain closed due to the centrifugal force encountered in the bank. The microswitch 35 is therefore provided to open the stator field coil circuit during a perfect bank of the aircraft and the construction of the switch is such that it remains closed at all other times. This is accomplished by a weight 35a attached to the lower switch contact arm 35b of the microswitch 35. Normally the spring tension of contact arm 35b is sufficient to hold the switch closed and to support the weight 35a but when the aircraft is caused to execute a perfect bank, centrifugal force will act upon said weight to cause separation of the contact points 35c thus breaking the stator field coil circuit independently of the mercury switches 36 and 36a respectively.

When the stator field coils 20 are to be energized by a single phase current, the wiring diagram shown in Fig. 5 may be used. As here shown, conductor 31 representing one side of the service line leads directly to the stator field coils whereas conductor 30, representing the other side of the line includes the microswitch 35 and gravity controlled switches 36 and 36a.

When a three phase current is to be used for energizing the stator field coils 20 the wiring diagram shown in Fig. 6 may be used. In this case the microswitch 35 and gravity controlled switches 36 and 36a are preferably used to control energization and de-energization of a solenoid 37. When all of the switches are closed, solenoid 37 is energized by the following circuit; conductor 38 leading from the plus side of battery 39 to one terminal of switch 36; through the ball of mercury 36b to the other terminal of switch 36; through conductor 40 to one terminal of switch 36a, through the ball of mercury 36c to the other terminal of switch 36a, through conductor 41 to microswitch 35; through said switch and conductor 41a to solenoid 37, and then through conductor 42 to the minus side of battery 39.

When solenoid 37 is energized its armature acts to close the circuit of line conductors 43 and 44 leading to the stator field coils in the conventional manner, and the third conductor 45 leads directly from the line or current source to said field coils 20.

It has been previously mentioned that energization and de-energization of the stator field coils can be controlled within a pre-determined number of degrees of tilt of the gravity controlled switches 36 and 36a. While the present switches are designed to permit approximately five degrees of tilt before opening, it will be obvious that the switches can be designed to open whenever any tilt is present, or to open after a tilt of more than five degrees takes place.

It is sufficient to state here that the microswitch 35 and gravity controlled mercury or cut-off switches 36—36a are actuated to open, and thereby de-energize the stator field coils 20 whenever pitching or rolling of the aircraft takes place so that unfavorable torques or stresses imparted to the stator during flight will not cause precession of the rotor spin axis. Stating it another way, energization of the stator field coils depends upon a substantially stabilized condition of the universally mounted pendulous stator. It will be observed that my improved stator has a two-fold purpose, namely, to spin the rotor and to prevent precession of the rotor spin axis.

While I have shown and described a particular embodiment of my invention it will be apparent to those skilled in the art that numerous modifications and variations may be made in the form and construction thereof, without departing from the more fundamental principles of the invention. I, therefore desire, by the following claims, to include within the scope of my invention all such similar and modified forms of the apparatus disclosed, by which substantially the results of the invention may be obtained by substantially the same or equivalent means.

Having thus described my invention what I claim as new and desire to secure by Letters Patent is:

1. In a gyro-vertical, a universally mounted gyroscope rotor having a normally vertical spin axis, a stator universally mounted independently of said rotor, electrical means for spinning said rotor about its normally vertical spin axis including a rotating field carried by the stator, a working current for said field, gravitationally responsive means effective to normally hold the stator in horizontal position, and gravitationally responsive cut-off means for said working current operative to de-energize said rotating field during angular tilt of said stator.

2. In a gyro-vertical of the class described the combination of a universally mounted rotor having a normally vertical spin axis, a stator universally mounted independently of the rotor, gravitationally responsive means acting to normally maintain the stator in substantially horizontal position, electrical means for spinning the rotor including a rotating field carried by the stator, means for energizing said field, and gravitationally responsive cut-off means effective to de-energize said field during pre-determined angular tilt of said stator.

3. In a gyro-vertical of the class described the combination of a gyro rotor suspended for freedom about mutually perpendicular and normally horizontal axes and having a normally vertical spin axis, a stator mounted for freedom about mutually perpendicular and normally horizontal axes and independently of the rotor, gravitationally responsive means acting to normally maintain the stator in substantially horizontal position, electrical means for spinning the rotor including a rotating field carried by the stator, a working current to energize said field, and gravitationally responsive means effective to cut off the current to said field when the stator assumes a pre-determined angular tilt relative to said rotor for the reasons specified.

4. In a gyroscopic device of the class described wherein a gyro rotor is supported in substantially neutral equilibrium by a pair of gimbals to have a normally vertical spin axis, and wherein a stator is universally mounted independently of said rotor, the combination of gravitationally responsive means acting to normally maintain the stator in horizontal position, a rotating field for the stator which when energized spins the rotor, and gravity controlled means for effecting energization of said rotating field when the stator is in substantially horizontal position and to cause de-energization of said rotating field when the stator is tilted through unfavorable torques or stresses applied thereto.

5. In a gyroscopic device for moving craft and the like wherein a rotor is universally supported in substantially neutral equilibrium to have a normally vertical spin axis; and wherein a stator is universally mounted and free to tilt relative to said rotor; the combination of gravitationally responsive means carried by the stator for normally maintaining the latter in substantially horizontal position relative to the rotor, means for spinning the rotor including a rotating field carried by the stator, an electrical source of current for energizing said field, and gravity controlled means to de-energize said field when the stator is tilted through unfavorable torques or stresses applied thereto by sudden movements of said craft upon which the device is mounted.

6. In a gyro-vertical for aircraft and the like, the combination of a gyroscope comprising a rotor mounted for freedom about mutually perpendicular and normally horizontal axes to have a normally vertical spin axis, a pendulous stator universally mounted independently of said rotor, electric means for spinning said rotor at high speeds including a rotating field carried by the stator, said last named means normally acting to prevent precession of said rotor spin axis during straight flight operations of the aircraft, a working current for said field, and gravity controlled electrical means to effect energization of said field by said working current when said stator is in substantially horizontal position, and to cause de-energization of said field when said stator is tilted through unfavorable torques or stresses.

7. In a gyro-vertical for aircraft and the like having a pair of gimbals mounted for freedom about mutually perpendicular and normally horizontal axes, a high speed gyro rotor supported by one of said gimbals to spin about a normally vertical axis, a housing mounted upon the aircraft and pivotally supporting one of said gimbals, a pendulous stator, electrical means for spinning the rotor including a rotating field wound upon the stator and arranged to define an arcuate air gap between said stator and rotor, means for universally mounting said stator relative to said housing and rotor, an electromagnetic couple created within said arcuate air gap during energization of said rotating field to prevent departure of the rotor spin axis from its normally vertical position, and gravitationally responsive means effective to deenergize said rotating field when acceleration or deceleration forces act upon said housing to tilt said stator.

8. In a gyro-vertical for aircraft and the like the combination of a pair of gimbals mounted for freedom about mutually perpendicular and normally horizontal axes, a gyro rotor supported by one of said gimbals to spin about a normally vertical axis, a housing mounted upon the aircraft to pivotally support one of said gimbals, a pendulous stator, electrical means for spinning the rotor including a rotating field wound upon the stator and arranged to define an arcuate air gap between said stator and rotor, means for universally mounting said stator relative to said rotor and housing, an electromagnetic couple created within said arcuate air gap during energization of said rotating field to normally prevent precession of said rotor spin axis, and gravitationally responsive means effective to de-energize said rotating field when unfavorable torques of sufficient magnitude act upon said housing to tilt said stator, said last named means including a pair of gravity controlled mercury switches and a micro switch substantially as described.

9. In an electric driven gyro-vertical for aircraft and the like having a universally mounted gyro rotor the spin axis of which is normally vertical and a universally mounted pendulous stator, the combination of means for electrically spinning the rotor at high speeds including a rotating field carried by the stator, a working current for said field, and gravity controlled switches effective to complete energization of said field by said working current when said stator is in substantially horizontal position, and effective to de-energize said field when unfavorable torques of sufficient magnitude are applied to said craft to tilt said stator a pre-determined number of degrees.

10. In a gyroscopic device of the class described wherein a rotor is supported in substantially neutral equilibrium by a pair of gimbals to have a normally vertical spin axis; and wherein a stator is universally mounted independently of said rotor; the combination of gravitationally responsive means acting to normally maintain the stator in horizontal position, a working current, a rotating field for the stator which when energized by said working current spins the rotor at high speeds, and gravity controlled switch means for effecting energization of said rotating field when the stator is in substantially horizontal position and to cause de-energization of said rotating field when the stator is tilted through unfavorable torques or stresses applied thereto.

11. In a gyroscopic device of the class described for aircraft and the like wherein a rotor is universally supported in substantially neutral equilibrium to have a normally vertical spin axis and wherein a stator is universally mounted and free to tilt relative to said rotor, the combination of a pendulum carried by the stator for normally maintaining the latter in stabilized horizontal position, means for spinning the rotor including a rotating field carried by the stator, a source of electric current for energizing said field, and switch means to effect de-energization of said field when the stator is tilted by unfavorable torques or stresses during flight of said aircraft.

THOMAS O. MEHAN.